Patented Feb. 21, 1950

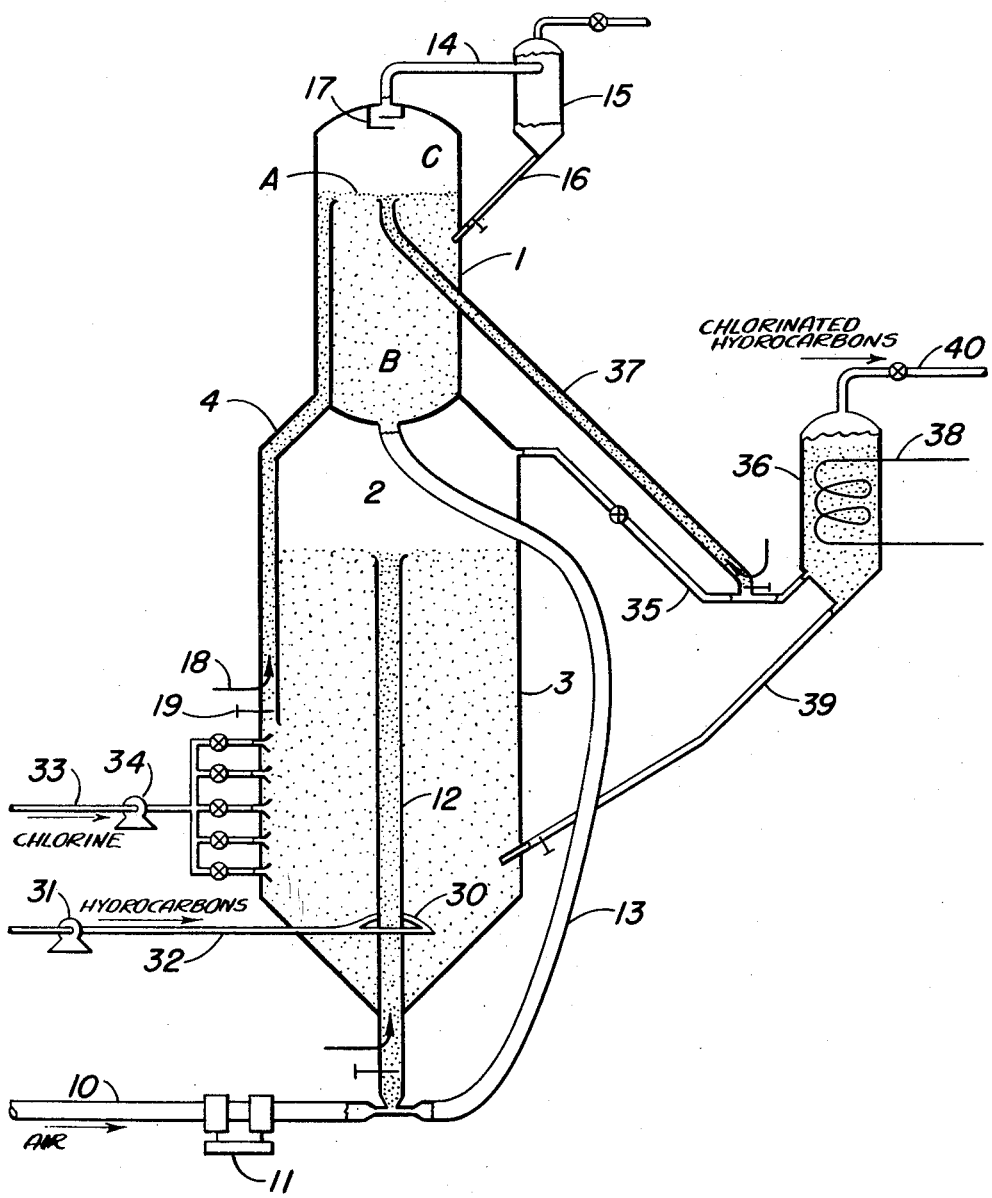

2,498,552

UNITED STATES PATENT OFFICE 2,498,552

HALOGENATION PROCESS

Evert W. Kilgren and Everett Gorin, Dallas, Tex., assignors, by mesne assignments, to Socony-Vacuum Oil Company, Incorporated, New York, N. Y., a corporation of New York Application January 11, 1946, Serial No. 640,652

9 Claims. (Cl. 260—662)

This invention relates to the chlorination of hydrocarbons. More particularly, this invention relates to a method for the continuous production of hydrocarbon chlorides such as alkyl chlorides and alkylene chlorides from light paraffinic hydrocarbons.

Various chlorinated hydrocarbons are of great importance in the organic chemical and petroleum industries as reactive intermediates for the production of many essential materials. The manufacture of butadiene from dichlorbutane and alkylation of methyl chloride with benzene to give toluene are examples of the industrial application of these chlorides of hydrocarbons. Methyl chloride in particular is a valuable intermediate for the production of benzene, toluene, acetylene, and ethylene from methane, the principal component of natural gas. In the production of these chlorides hydrogen chloride is liberated in the chlorination procedure. The commercial feasibility of most of the chlorination processes depends upon the economical utilization of the hydrogen chloride produced in such chlorination process. We have found a method whereby the hydrogen chloride may be converted in situ to additional chlorinating agent when utilizing free chlorine as the main chlorinating agent, thus obtaining in addition to utilization of the hydrogen chloride, partial purification of the chlorinated product.

Several prior art methods have attempted the recovery and reconversion of hydrogen chloride by processes wherein the oxidation of the hydrogen chloride and the chlorination of the hydrocarbon are carried out simultaneously. For example, it has been suggested that methyl chloride be produced by passing a mixture of methane, hydrogen chloride, and air oxygen, over a supported copper halide catalyst. In a similar manner it has been proposed to manufacture chlorbenzene by reaction between benzene, hydrogen chloride, and air. The main disadvantage of this type of process lies in the fact that the chlorides of hydrocarbons produced are diluted with large quantities of oxygen depleted air from which the quantitative recovery of the chlorinated hydrocarbon requires additional and expensive processing. Also a considerable loss of hydrocarbon is incurred by direct oxidation thereof to products such as carbon monoxide and carbon dioxide. In addition, the recovery and utilization of the hydrogen chloride is not quantitative in that provision must be made for the recovery and recycle of unreacted hydrogen chloride.

The primary object of the present invention is to provide a continuous method for the production of chlorinated hydrocarbons from chlorine and normally gaseous paraffinic hydrocarbons such as hydrocarbons contained in natural gas. A second object of the invention is to provide a method for utilizing in situ in a hydrocarbon-chlorination zone the hydrogen chloride produced therein where free chlorine is utilized as the primary chlorinating agent. A further object of the invention is to provide a method for the continuous chlorination of paraffinic hydrocarbons including paraffins containing up to four or five carbon atoms per molecule. Still another object of the invention is to provide a continuous, stepwise, substantially adiabatic process for the manufacture of chlorinated hydrocarbons in quantity with efficient reuse in situ of the hydrogen chloride produced in such process. Other objects of the invention will be apparent from the drawing and the detailed description hereinbelow.

In carrying out our process, oxygen is absorbed from the air by cuprous chloride, either in the form of a molten mass containing cuprous chloride or in the form of a finely divided copper chloride impregnated porous solid such as cuprous chloride impregnated alumina gel, cuprous chloride impregnated silica gel or cuprous chloride impregnated natural clay. If desired, an alkali metal chloride such as potassium chloride may be included with the cuprous chloride to accelerate the rate of oxygen absorption by the reactant and to decrease the vapor pressure of the copper chlorides. The oxidized reactant consisting of cupric oxychloride is transferred to a separate reaction zone and contacted therein with a gaseous mixture consisting of the hydrocarbon to be chlorinated, free chlorine and the hydrogen chloride formed in situ in the chlorination of said hydrocarbon by the chlorine. The hydrogen chloride converts the cupric oxychloride to cupric chloride which also acts as a chlorinating agent and is reconverted to cuprous chloride. The process involves four main chemical reactions which may be illustrated by the following equations:

(1) $Cu_2Cl_2 + \frac{1}{2}O_2 \rightarrow CuO \cdot CuCl_2$ (2) $RH + Cl_2 \rightarrow RCl + HCl$ (3) $CuO \cdot CuCl_2 + 2HCl \rightarrow 2CuCl_2 + H_2O$ (4) $2CuCl_2 + RH \rightarrow RCl + Cu_2Cl_2 + HCl$ Equations 2, 3, and 4 may be combined as Equation 5 below to illustrate the overall reaction taking place in the chlorination zone.

(5)  $2RH + Cl_2 + CuO \cdot CuCl_2 \rightarrow 2RCl + H_2O + Cu_2Cl_2$

The hydrogen chloride formed in the hydrocarbon chlorination reactions, illustrated by Equations 2 and 4, is reacted with the cupric oxychloride to form additional chlorinating agent consisting of cupric chloride thereby purifying the effluent from the chlorination zone with respect to hydrogen chloride content. Thus, for each mole of cupric oxychloride introduced to the chlorination zone one mole of gaseous chlorine is also introduced and two moles of paraffinic hydrocarbon may be converted to two moles of substantially hydrogen chloride free alkyl chloride. Of the above reactions, Reaction 1 is designated as the oxidation step of the process.

The oxidation step of the process is carried out at temperatures within the range of from about 200° C. to about 425° C., preferably from about 350° C. to about 425° C. and at pressures from about atmospheric to ten atmospheres. When operating with the reactants in the form of molten mixtures, temperatures sufficiently high to keep the salt molten must be used. Depending upon the salt mixture, temperatures of from about 250° C. to about 300° C. represent minimum operation temperatures in the oxidation zone.

Equations 2 and 4 above represent hydrocarbon chlorination reactions while Equation 3 is designated as the neutralization reaction. Reactions 2, 3, and 4 are carried out at reaction bed temperatures within the range of from 350° C. to 425° C. Satisfactory results may be obtained over the range from about 325° C. to about 450° C. Higher temperatures up to 500° C. may be used when operating with molten reactant. The use of powder supported reactant makes lower temperatures more practical and desirable since more surface and more intimate contact with the gases may be obtained than are possible when using molten reactant. High temperatures, that is, 425° C. or 450° C. to 500° C., result in undesirable cracking of the chlorinated hydrocarbon product when operating with supported reactant in fluid flow. The amount of this cracking depends upon the particular support employed and is particularly bad with the alumina gel supported reactant where high temperatures, i. e., above 425° C., are employed.

The preferred embodiment of the invention involves the adaptation of fluidized finely divided solids for contacting the oxidized cuprous chloride with the gaseous mixture of chlorine, hydrocarbon, and the hydrogen chloride produced by the chlorination of the hydrocarbon in the chlorination step, and for contacting the reduced cuprous chloride with a free oxygen containing gas in a separate oxidation step. In another embodiment the cupric oxychloride and the cuprous chloride are mixed with a metal chloride, preferably an alkali metal chloride such as potassium chloride and the reactant mass is circulated between the reaction zones as a molten liquid stream as taught in the copending application of Everett Gorin, entitled Acid recovery process, Serial Number 507,617, filed October 25, 1943, now Patent No. 2,418,930.

Potassium chloride in amounts within the range of from about 20 mole percent to 45 or 50 mole percent of the total impregnated chlorides increases the rate of oxygen absorption. The melting point of an eutectic mixture containing from 20 to 45 mole percent of potassium chloride with copper chloride or copper chlorides is sufficiently low to permit operation of the process by means of circulating molten mixtures. Halides of metals other than the alkali metals may be used in place of or together with the alkali metal chlorides. Thus, halides of certain heavy metals such as lead, zinc, silver, or thallium may be incorporated with the copper chlorides as melting point depressants or volatility depressants.

When it is desired to operate the process in fluid flow technique using powdered solid impregnated with the copper chlorides, the carrier material may be impregnated with an aqueous solution containing cupric chloride. If desired, potassium chloride may be included in the solution, preferably to the extent of about 30 moles of potassium chloride for 70 moles of cupric chloride to improve the rate of oxygen absorption as described above. The finely divided carrier is impregnated to the extent of from about 20 percent by weight to 65 percent by weight of total chlorides based on the total weight of the dry impregnated mass. The impregnated mass is dried, crushed, and graded. Material passing the 30 mesh standard screen and retained on a 100 mesh standard screen is preferred. However, material as fine as 50 micron diameter may be used. The impregnated finely divided solid agent may be in the form of small spherical bead-like particles of synthetic gel, such as alumina gel, impregnated with the copper chlorides, with or without the alkali metal component. Various methods may be used for preparing the alumina gel beads. One method consists of spraying an atomized stream of hydrosol into a body or liquid such as petroleum oil which should contain a gelation agent. The bead-like particles may then be dried and impregnated with the cupric chloride and, if desired, potassium chloride.

Since it is desirable to use the impregnated carrier in the oxygen absorption step, a major part of the cupric chloride component must be reduced first to cuprous chloride. This may be accomplished by circulating the cupric chloride impregnated material in contact with a hydrocarbon through the chlorination zone described hereinbelow or by heating the same at a temperature in excess of 500° C. In the absence of alkali metal chlorides the cupric chloride may be theoretically completely reduced, but practically a small amount of cupric chloride will be retained in the impregnated carrier following reduction of the agent in the chlorination step of the process and in actual operation this will reach a steady state value.

When potassium chloride is used with the copper chlorides the amount of cupric chloride remaining in the impregnated salt mixture as introduced into the oxygen absorption step preferably should be between about 0.25 and about 1.5 moles per mole of potassium chloride or other alkali metal chloride. For a 30 mole percent potassium chloride mixture the preferred range of initial cupric chloride content of the reactant mass lies between about 0.5 and 1.0 mole per mole of potassium chloride.

In carrying out the present process free chlorine is used as the chlorinating agent. The reaction between the hydrocarbon and chlorine is exothermic and hence the heat liberated by the direct chlorination with chlorine is utilized to maintain the temperature at sufficiently high level to promote chlorination of additional hydrocarbon by means of the cupric chloride formed in reacting the oxidized cuprous chloride with the hydrogen chloride liberated. The method of chlorinating hydrocarbons with cupric chloride wherein only hydrogen chloride and the hydrocarbons are contacted with cupric oxychloride, that is, chlorination in the absence of added free chlorine, is taught and claimed in the copending application of Everett Gorin entitled Manufacture of halogenated hydrocarbons, Serial No. 640,651, filed January 11, 1946.

Referring to the drawing which represents diagrammatically the hindered flow embodiment of the invention, the oxidation step is carried out in chamber 1. The neutralization and chlorination steps represented by Equations 2, 3, and 4 above are carried out in zone 2 of tower 3. The oxidized agent is transferred from the oxidation zone 1 to the neutralization-chlorination zone 2 through internal standpipe 4.

Air in line 10 is raised in pressure by compressor 11 and is passed at a temperature of say 275° C. to 300° C. through the injector at the base of standpipe 12 where reduced, copper chloride impregnated, finely divided particles are picked up and transferred through line 13 and introduced at or near the base of oxidation chamber 1. If desired, transfer line 13 may lead to a cyclone separator (not shown in the drawing) and the finely divided particles may be delivered therefrom to chamber 1 in which case a separate stream of air is introduced to chamber 1 to supply oxygen and maintain hindered settling conditions in chamber 1. The temperature of the air suspension of particles entering chamber 1 should not exceed 400° C. and preferably should not exceed about 325° C. or 350° C. As the air passes upward in chamber 1 the linear velocity of the air is reduced and the particles suspended therein tend to settle and collect to form a fluidized dense mass of solid particles resembling a boiling liquid with a pseudo interface A between the fluidized relatively dense zone B and zone C, a zone of relatively low concentration of suspended reactant.

The linear velocity of the air in chamber 1 should be within the range of from about 0.25 to 5.0 feet per second depending on the particle size of the supported reactant and on the contact time desired. A linear velocity of about 1.5 feet per second is usually sufficiently low to give substantially complete oxidation of the cuprous chloride to cupric oxychloride where the particle size in a fluidized bed of 5 feet to 25 feet depth is within the range of 30 to 100 mesh. If desired, the temperature of the fluidized mass in the oxidation zone may be controlled by means of cooling coils immersed in dense zone B of the reaction zone or a part of the fluidized mass may be withdrawn from dense zone B either continuously or intermittently, passed through a heat exchanger and returned to the reaction zone. The temperature in chamber 1 should not be allowed to go above the temperature in the chlorination zone, that is, chamber 2, since the reactions carried out therein are predominantly exothermic. The requirement for external cooling of the agent in dense zone B may be minimized by not preheating the air charged through line 10.

Air, at least partially depleted of oxygen, passes from chamber 1 through line 14 to cyclone separator 15 where the major part of the particles suspended in the residual gas are recovered and returned to chamber 1 via valved dipleg 16. The gaseous effluent may be further purified of residual suspended particles by passing the gas through one or more Cottrell precipitators. A part of the oxygen depleted air may be recycled as carrier gas, thereby reducing the rate of oxidation and hence reducing the temperature in dense zone B. If desired, a cooler may be installed in line 14 to cool the gaseous effluent in order to condense any vaporized copper chlorides in the presence of particles suspended in the gaseous effluent whereby at least a part of the vaporized chlorides become resorbed with the particles and are returned therewith to the system via dipleg 16. Reaction chamber 1 is provided with baffles 17 in order to reduce the amount of suspended particles carried from the reaction zone.

The oxidizing agent in the fluidized bed B overflows into standpipe 4 wherein it collects as a relatively dense mass of settled particles. In order to cause free flow of the settled particles to chlorination zone 2 the contents of standpipe 4 may be aerated by means of air and the descending column of particles may be stripped with flue gas or with oxygen depleted air introduced at point 18 above valve 19 through which the oxidized support impregnant is delivered from standpipe 4 to chlorination zone 2.

The agent comprising a major proportion of suspended cupric oxychloride is fluidized to form a relatively dense bed in chlorination zone 2 by hydrocarbon vapor introduced to distributing plate 30 by means of compressor 31 in line 32. Chlorine gas is introduced at a multiplicity of points to zone 2 through line 33 by means of compressor 34, and if desired, a small stream of chlorine may be introduced to chamber 1 in order to convert a part of the cuprous chloride to cupric chloride chlorinating agent. However, we prefer to introduce free chlorine to chamber 2 only, thus reserving the cuprous chloride for conversion to the oxychloride.

The chlorine in chamber 2 reacts with the hydrocarbon to form chlorinated hydrocarbons and hydrogen chloride which in turn reacts with the cupric oxychloride to form cupric chloride therefrom, thus reducing the amount of hydrogen chloride in the gaseous effluent from chamber 2. The cupric chloride reacts endothermally with the hydrocarbon to produce additional chlorinated hydrocarbons thus utilizing a part of the heat produced by chlorinating the hydrocarbon directly with chlorine.

Chlorination zone 2 is maintained at a temperature from about 350° C. to about 425° C. The pressure maintained in chamber 2 is somewhat higher than the pressure in chamber 1. The difference in pressure maintained in chambers 2 and 1 is somewhat less than the weight of the fluidized dense column of reactant in standpipe 4 which delivers the reactant to chamber 2.

As the mixture of reactant gases passes upward through the fluidized bed in chamber 2 the reactions represented by Equations 2, 3, and 4 above occur and the cupric oxychloride of the impregnated powder is reconverted to impregnated cuprous chloride. The reduced particles overflow into standpipe 12 whence the same is withdrawn by the air stream in line 10 described above. Standpipe 12 may be aerated by a small stream of hydrogen chloride and the column of particles may be stripped of reactant gases by a suitable inert gas such as nitrogen or flue gas. The vapor product of chlorination zone 2 consisting of unreacted hydrocarbons, chlorinated hydrocarbons, water vapor, suspended powdered agent, and, when chlorinating at temperatures in the upper part of the above range, small amounts of unreacted hydrogen chloride passes overhead through line 35 to reagent recovery zone 36.

It is highly desirable to recover from the gaseous effluent stream from chlorination zone any hydrogen chloride, vaporized copper chloride reactant and also suspended powder. This may be accomplished by scrubbing the gaseous effluent with a part of the oxidized reactant to absorb from the effluent any hydrogen chloride which escapes reaction in the chlorination zone and copper chlorides which are vaporized therein. In the preferred embodiment, the hydrogen chloride and vaporized copper chlorides may be recovered by injecting into the vapor stream in line 35 freshly oxidized supported copper chloride reactant from chamber 1. The effluent is cooled in the presence of the injected particles. The particles are introduced through standpipe 37 which serves as a drawoff line for settled agent from the dense zone B of chamber 1. The column of particles in standpipe 37 may be aerated by means of flue gas. The injected agent is maintained in a state of hindered settling in recovery zone 36 by means of the gaseous effluent and the fluidized mass is cooled by means of coil 38 to a temperature preferably below 300° C. The hydrogen chloride is removed by neutralization of the oxychloride and vaporized copper chlorides are resorbed on the agent. The settled particles may then be returned to chlorination zone 2 through dipleg 39. While we prefer the above method of recovering hydrogen chloride from the gaseous effluent of the chlorination zone, other methods well known to the art may be used for removing the hydrogen chloride from this gaseous stream. For example, product gas may be scrubbed with water or other suitable hydrogen chloride solvent and hydrogen chloride may be recovered from the solution and recycled to the chlorination zone. The partially clarified gaseous effluent from recovery zone 36 passes overhead through line 40 to cyclone separators and Cottrell precipitators for final clarification and thence to an absorption and fractionation system for separation of chlorinated hydrocarbons from unreacted hydrocarbon. Unreacted hydrocarbon is recycled to line 32 for successive passes through the chlorination zone. If desired, partially chlorinated hydrocarbons may be recycled to zone 2 to more completely chlorinate the partially chlorinated product.

There are several advantages to be gained by operating a continuous hydrocarbon chlorination process according to our invention. The isolation of the oxidation step makes possible the production of a gaseous effluent from the chlorination zone which is free of nitrogen and residual oxygen. In addition, the isolation of the exothermic oxidation step materially reduces the amount of heat generated in the zone where the hydrocarbon is chlorinated, thus making possible better temperature control. The process also makes possible the production of a chlorination zone effluent which is relatively free of hydrogen chloride and no separation of hydrogen chloride and reconversion of the same to chlorine in a separate step are required.

While in the above description and in the specific example specific conditions are indicated, it should be understood that the invention is not limited to this particular example. Alternative methods of operating a continuous hydrocarbon chlorination process may be used wherein chlorides of copper are utilized in successive oxidation, and neutralization-chlorination reactions and wherein free chlorine is introduced to the chlorination zone to cooperate with a cupric chloride chlorinating agent in the chlorination of hydrocarbons. Thus, as indicated above, the reactants may be circulated as molten streams between the reaction zones or the copper chlorides may be impregnated in relatively large particles of porous solid carrier material which may be contacted with the reactant gases in the form of continuously moving beds in the oxidation zone and in the neutralization-hydrocarbon chlorination zone in which type operation transfer of the supported copper chloride agent between reaction zones may be made by gravity and/or by a mechanical conveyor system. It will be readily apparent to those skilled in the art that the invention may variously be practiced and embodied within the scope of the claims hereinafter made.

We claim:

1. The process for the chlorination of normally gaseous paraffinic hydrocarbons which comprises introducing the hydrocarbon to be chlorinated and chlorine into a chlorination zone, introducing cupric oxychloride into said chlorination zone, maintaining a temperature within the range of from about 325° C. to about 500° C. in said chlorination zone, regulating the rate of introduction of said cupric oxychloride so that at least one mole of oxychloride is introduced per mole of chlorine introduced thereto, and recovering the chlorinated hydrocarbons from the gaseous effluent from said chlorination zone.

2. The process for the chlorination of normally gaseous paraffinic hydrocarbons which comprises suspending a cupric oxychloride impregnated inert carrier by means of a gaseous mixture consisting essentially of the paraffinic hydrocarbon and chlorine in a reaction zone at a temperature between 325° C. and 450° C. whereby said hydrocarbon is at least partially converted to at least one chlorinated hydrocarbon and the hydrogen chloride liberated is at least in part neutralized by the cupric oxychloride and oxidizable cuprous chloride formed therefrom, separating the gaseous reaction product from the supported cuprous chloride in said reaction zone and fractionating the gaseous reaction product to recover said chlorinated hydrocarbon.

3. The process for the chlorination of normally gaseous paraffinic hydrocarbons which comprises introducing the hydrocarbon and chlorine into a chlorination zone, introducing cupric oxychloride into said chlorination zone, maintaining a temperature within the range of from about 325° C. to about 500° C. in said chlorination zone, regulating the rate of introduction of said cupric oxychloride so that at least one mole of oxychloride is introduced per mole of chlorine introduced thereinto whereby substantially all hydrogen chloride formed is neutralized and the cupric chloride formed thereby reduced to cuprous chloride, recovering chlorinated hydrocarbons from the gaseous effluent from said chlorination zone, and recovering the cuprous chloride from the reaction zone.

4. The process of claim 3 wherein the normally gaseous paraffinic hydrocarbons are a natural gas.

5. The process for the chlorination of normally gaseous paraffinic hydrocarbons which comprises suspending a cupric oxychloride impregnated inert carrier by means of a gaseous mixture consisting essentially of the paraffinic hydrocarbon and chlorine in a chlorination zone maintained at a temperature within the range of from about 325° C. to about 450° C. whereby said hydrocarbon is at least partially converted to at least one chlorinated hydrocarbon and the hydrogen chloride liberated is neutralized by cupric oxychloride and cuprous chloride formed from the neutralized cupric oxychloride, regulating the rate of introduction of said cupric oxychloride to said chlorination zone so that at least one mole of oxychloride is introduced per mole of chlorine introduced whereby the hydrogen chloride liberated is substantially completely neutralized, separating the gaseous reaction product from the suspended cuprous chloride in the chlorination zone and recovering chlorinated hydrocarbon from the gaseous reaction product.

6. The process of claim 5 wherein the normally gaseous paraffinic hydrocarbons are a natural gas.

7. The process for the chlorination of normally gaseous paraffinic hydrocarbons which comprises the steps of (1) suspending as a fluidized bed in a chlorination zone maintained at a temperature within the range of from about 350° C. to about 425° C. oxidized cuprous chloride impregnated solid by means of a gaseous mixture introduced thereinto consisting essentially of the normally gaseous paraffinic hydrocarbon and chlorine whereby at least a part of the hydrocarbon is chlorinated and at least a part of the hydrogen chloride produced reacts with the oxidized cuprous chloride to form cupric chloride and oxidizable cuprous chloride formed therefrom, (2) withdrawing gaseous reaction product and impregnated solid from said chlorination zone, (3) recovering chlorinated hydrocarbon product from the gaseous reaction products, (4) transferring the impregnated solid from the chlorination zone to a separate oxidation zone, (5) regenerating the cuprous chloride content of the impregnated solid to form oxidized cuprous chloride by contacting with an oxygen containing gas at a temperature of from 200° C. to 400° C. and (6) reintroducing the impregnated solid containing oxidized cuprous chloride to the chlorination zone.

8. The process of claim 7 wherein the normally gaseous paraffinic hydrocarbons are a natural gas.

9. The process of claim 7 wherein the regenerated oxidized cuprous chloride impregnated solid is contacted with the gaseous reaction product effluent from the chlorination zone before reintroduction into the chlorination zone to substantially completely react with and remove any hydrogen chloride in said gaseous effluent.

EVERT W. KILGREN.
EVERETT GORIN.

REFERENCES CITED

The following references are of record in the file of this patent:

UNITED STATES PATENTS

| Number | Name | Date |
| --- | --- | --- |
| 1,591,984 | Krause et al. | July 13, 1926 |
| 2,046,411 | Ramage | July 7, 1936 |
| 2,407,828 | Gorin | Sept. 17, 1946 |

FOREIGN PATENTS

| Number | Country | Date |
| --- | --- | --- |
| 106,241 | Austria | Apr. 25, 1927 |
| 214,293 | Great Britain | Apr. 14, 1924 |
| 513,947 | Great Britain | Oct. 26, 1939 |
| 673,521 | Germany | Mar. 23, 1939 |